United States Patent Office 3,463,795
Patented Aug. 26, 1969

3,463,795
UNSATURATED CYCLOHEPTANO PERHYDRO PHENANTRENES AND THEIR PREPARATION
Shalom Sarel, Yehuda Yanuka, and Yehuda Shalon, all c/o School of Pharmacy in conjunction with The Hebrew University, P.O. Box 1172, Hadassah Medical School, Jerusalem, Israel
No Drawing. Continuation-in-part of applications, Ser. Nos. 385,781, 385,760 and 415,215, all dated July 28, 1964. This application Jan. 13, 1967, Ser. No. 609,006
Int. Cl. C07c 169/52, 173/00
U.S. Cl. 260—397.1                                   21 Claims

ABSTRACT OF THE DISCLOSURE

The present disclosure relates to the production of intermediates used for producing cardio-active compounds such as 14-desoxy-digitoxigenin. The intermediates include unsaturated carboxylic acids derived from 17-alkyl perhydro cyclopentano phenantrene in which the double bond is in the α, β-position to the carboxylic group. These compounds are formed from the saturated compounds, by way of corresponding bromo derivatives.

---

This application is a continuation-in-part of our previously filed and copending applications Ser. Nos. 415,-215; 385,781 and 385,760, each now abandoned, all filed on July 28, 1964, and is particularly directed to the subject matter of the first of such applications.

The present invention concerns unsaturated carboxylic acids derived from 17-alkyl perhydro cyclopentano phenantrene in which the double bond is in α,β-position to the carboxylic group. Quite generally, the products of the present invention may be defined by the following general Formula I

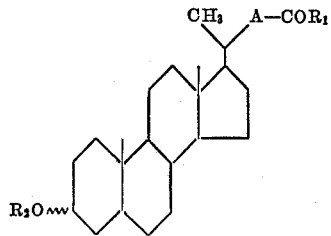

I

In this formula the perhydro cyclopentano phenantrene ring system may be further substituted, the symbol A stands for =CH or B—CH=CH— where B is either a carbon-to-carbon bond or an alkylene radical, $R_1$ is OH, the radical of an aliphatic, arylaliphatic or cycloaliphatic alcohol, or halogen, and $R_2$ is H, a lower alkyl or an acyl radical.

The invention further concerns the preparation of compounds of the above Formula I from the corresponding saturated compounds via the corresponding bromo derivatives, which latter are novel compounds and correspond to the following general Formula II

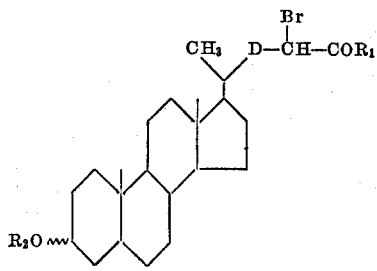

II in which D is either a carbon-to-carbon bond or an alkylene radical, $R_1$ and $R_2$ are as in Formula I, and the perhydro cyclopentano phenantrene ring system may be further substituted.

Several methods are known from literature for the introduction of a bromine atom by way of substitution into α-position to a carboxylic group. Thus, for example, it is possible to proceed by direct bromination of the free carboxylic acid but this reaction is slow and does not proceed to completion. The best method known so far for the α-halogenation of carboxylic acids is that known as the Hell-Volhard-Zelinsky method in which the acid chloride serves as starting material. In accordance with this method the acid chloride is reacted with the halogen, e.g. bromine, using red phosphorus as catalysts.

This method has been reported to be successful for the α-halogenation of a large variety of carboxylic acids, and it was, therefore, surprising to find that this method as well as all other known methods were unsuccessful for the α-halogenation of carboxylic acids of the general Formula III

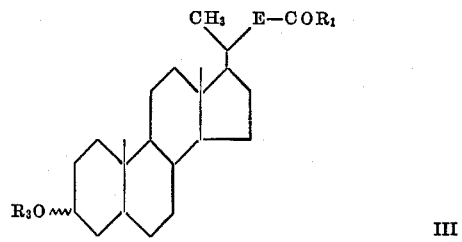

III where E is an alkylene radical, $R_1$ is as in Formula I, $R_3$ is lower alkyl or acyloxy and the perhydro cyclopentano phenantrene ring system may be further substituted.

In a first step of the process according to the invention for the preparation of an α,β-unsaturated carboxylic acid corresponding to the above general Formula I, a saturated free carboxylic acid of the above general Formula III ($R_1$=OH) is α-brominated to yield an α-bromo acid of the above general Formula II in which $R_2$ is lower alkyl or acyl, by reaction with elementary bromine in a thionyl chloride solution, and, if desired, the resulting α-bromo compound is reacted with water or an alcohol.

If desired, the bromination reaction according to the invention may be carried out in the presence of an acidic or basic catalyst such as, for example, hydrohalic acid, an organic base such as pyridine or lutidine, acid addition salts of an organic base such as pyridinium hydrobromide, and many others. The bromination may also be effected with pyridinium hydrobromide perbromide.

The bromination in accordance with the present invention can be carried out by dissolving the starting material of Formula III ($R_1$=OH) in a suitable amount of thionyl chloride, if desired heating the solution, and then gradually adding to this solution a thionyl chloride solution of bromine if desired together with a catalyst. The reaction vessel must be completely dry and during the reaction suitable measures must be taken for the exclusion of humidity. In the course of the bromination reaction, thionyl chloride apparently reacts with the carboxylic group to form the corresponding acid chloride. The acid chloride then reacts with bromine to form the corresponding α-bromo acid chloride and the latter is then reacted, if desired, with water or an alcohol to yield, respectively, the corresponding free α-bromo acid or α-bromo ester.

During the dissolution of the starting material of Formula III ($R_1$=OH) in thionyl chloride and the resulting formation of the corresponding acid chloride, hydrochloric acid is formed. In some cases this acid is sufficient for catalyzing the bromination. In other cases it may be preferable to add a catalyst, e.g. some more hydrochloric acid or a different acid or any other suitable catalyst.

In a second step of the process according to the invention, an unsaturated acid of the above Formula I is prepared from the corresponding bromo compound of Formula II by splitting off one molecule of HBr. In the literature there is described the so-called Hoffmann degradation for the production of α,β-unsaturated carboxylic acids. In accordance with this method, an α-amino carboxylic acid is converted into the corresponding betaine. The latter is then treated with an aqueous alkali, e.g. KOH, whereupon the desired α,β-unsaturated carboxylic acid is formed. It was, however, surprising to find that when this reaction is carried out with the bromo compounds of the general Formula II, by first converting these compounds into the correspond betaines, e.g. by reaction with trimethyl amine, and then reacting the resulting betaine with an aqueous alkali, no degradation occurs and the betaine grouping remains unchanged. Thus, when 3-acetoxy-22-bromo-norcholanic acid is reacted with trimethyl amine, a betaine is formed according to the following equation:

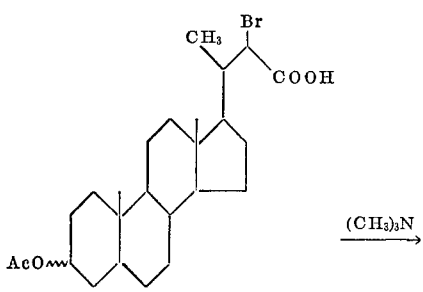

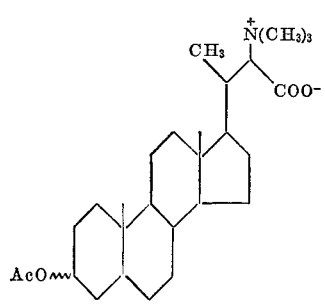

Treatment of this betaine with a boiling 60% aqueous KOH solution did not produce any change in the betaine grouping.

A further method common in organic synthesis for splitting off HBr and producing an ethylenic bond, is the direct treatment of the bromo compound with a base such as alcoholic KOH solution. However, it was found that with a series of bromo compounds of the general Formula II there occurs under these conditions a substitution of bromine for hydroxyl. Thus, treatment of 3-acetoxy-22-bromo-norcholanic acid with KOH in tert. butanol yields 3,22-dihydroxy-norcholanic acid.

Another known method for the production of α,β-unsaturated carboxylic acids consists in converting the corresponding β-hydroxy acids into the β-acetoxy saturated acids and submitting the latter to pyrolysis. It was to be expected that the same method would also be applicable to α-hydroxy saturated carboxylic acids obtained from the corresponding α-bromo compounds of Formula II. It was therefore surprising to find that when an α-acetoxy carboxylic acid of the general Formula IIa

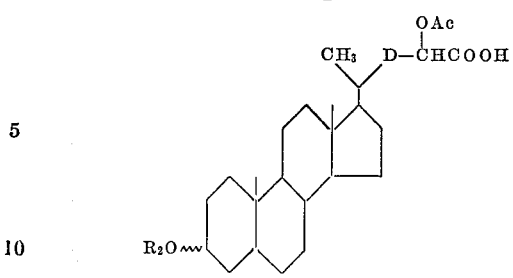

in which D, $R_1$ and $R_2$ have the same meanings as in Formula II, was submitted to pyrolysis this did not result in the production of the corresponding α,β-unsaturated acid.

The results were no better when the α-hydroxy carboxylic acid was pyrrolised in the presence of succinic acid anhydride or phthalic acid anhydride at a temperature of 200° C.

In accordance with the present invention, the α-bromo compound of Formula II is converted into the corresponding unsaturated compound of Formula I by reacting said bromo compound with an alkali metal lower alkoxide in a lower alkanol, if desired, in the presence of alkali metal iodide.

By proceeding in this manner the desired unsaturated carboxylic acids are obtained in high yield. This result was unpredictable from the prior art and is all the more surprising when considering that upon reaction of a compound of Formula II with another basic reagent such as an amine, e.g. trimethyl amine, pyridine (in the absence of iodide) or morpholine, the desired unsaturated acid is either not obtained at all or obtained in relatively small yields together with a number of different products. Thus, for example, by reacting 3-acetoxy-22-bromo-norcholanic acid or its methyl ester with pyridine, there occurs first a substitution of the bromine by the amine followed by decarboxylation resulting in the formation of a compound of the formula

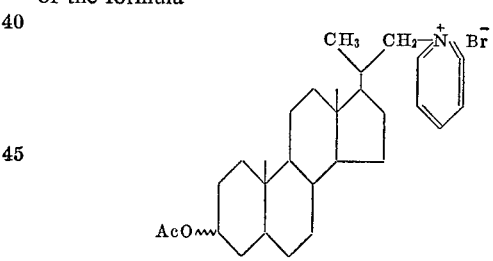

Likewise, when 3-acetoxy-22-bromo-norcholanic acid is treated with KOH in absolute ethanol, the following occurs:

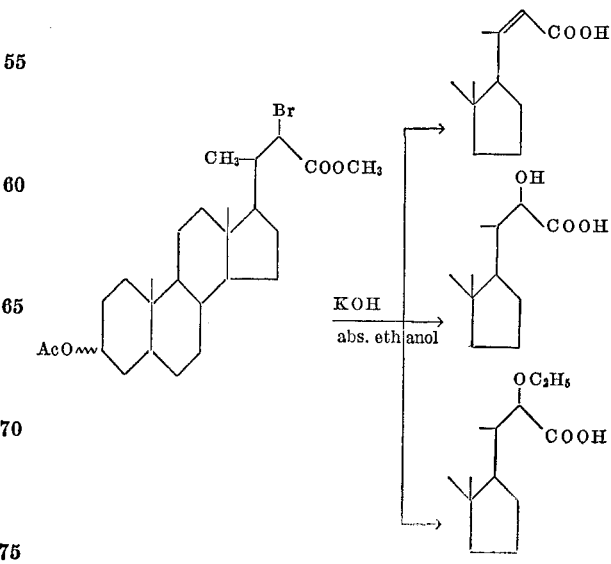

In this reaction the desired unsaturated acid forms only 20–25% of the products.

It would accordingly appear that the desired α,β-dehydrobromination of compound II is only obtainable satisfactorily with the specific agents specified above, namely, alkali metal lower-alkoxides, if desired, in the presence of alkali metal iodides. When proceeding in accordance with the invention as specified above, the desired unsaturated product may be obtained in yields as high as 90% and even higher. The nature of the substratum of Formula II and of the dehydrobromination agent must be selected in each individual case so as to obtain the best results. Thus, for example, in the case of 3-hydroxy-22-bromo-norcholanic acid the desired unsaturated acid is obtained in a yield of 92% when the substratum is the methyl ester, the dehydrobromination agent is tertiary sodium

1711 desoxycholic acid, lithocholic acid, the corresponding nor-acids and others.

All the unsaturated acids obtained in accordance with the invention are valuable intermediates in the synthesis of various physiologically active compounds, such as for example cardio-active compounds, e.g. 14-desoxy-digitoxigenin, which has cardiac activity. Thus, the intermediates of the present invention (unsaturated acids) may be converted to the corresponding butenolides by reaction with selenium dioxide in accordance with the invention in our copending application Ser. No. 385,781; or the bromides of the present invention may be converted by reaction with amines in accordance with the invention in our copending application Ser. No. 385,760. The overall digitoxin producing method is shown on the following chart:

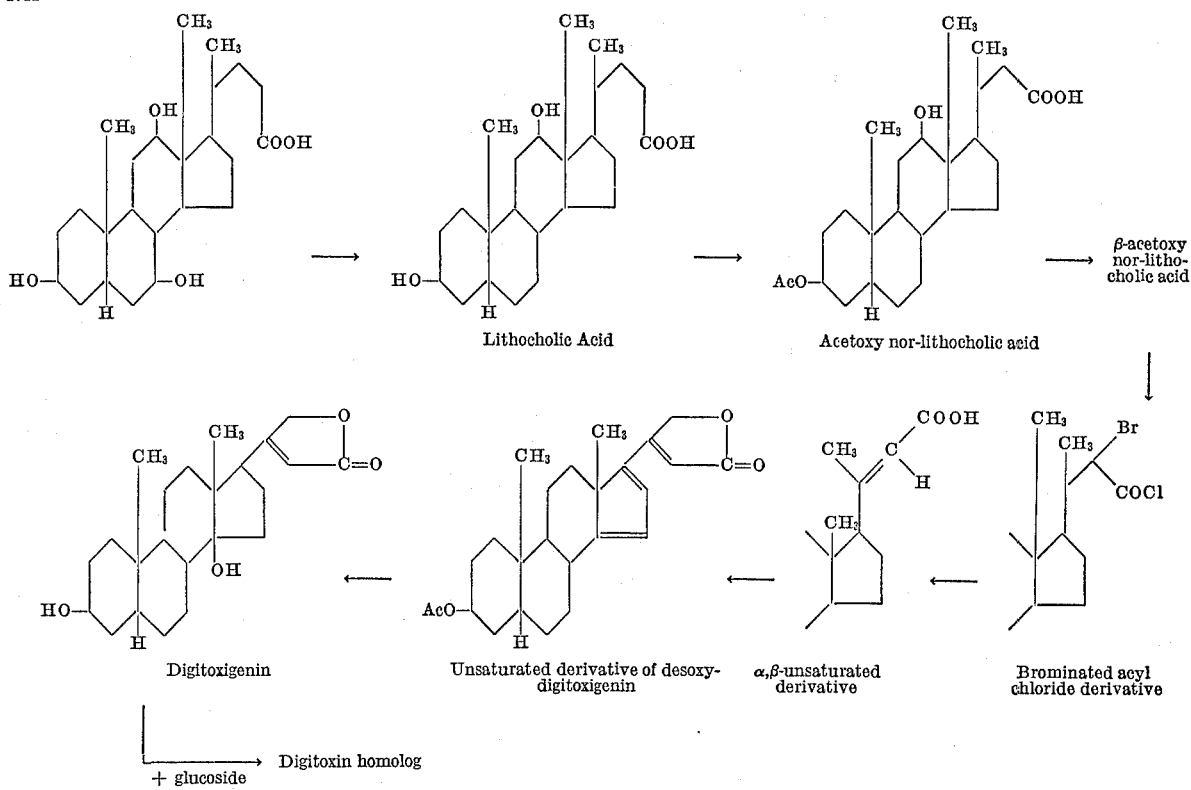

butoxide in tert. butanol and the reaction is carried out in the presence of NaI or KI. With 3-hydroxy-22-bromo-norcholanic acid chloride as substratum and using again NaI or KI, the yield is only 77%. Against this, with 3-hydroxy-23-bromo-cholanic acid the best results are obtained when the free acid serves as substratum, the dehydrobrominating agent is tertiary lithium butoxide in tert. butanol and the reaction is carried out in the presence of sodium or potassium iodide. The yield in this case is 90%. Where the same substratum and dehydrobrominating agent are used but without sodium or potassium iodide, the yield is only 60%.

The concentration of the alkali metal lower-alkoxide in the alkanol solution should be kept low and, as a rule, concentrations of less than 1 N are sufficient. Thus, for example, in the case of α,β-dehydrobromination of 3-acetoxy-22-bromo-norcholanic acid methyl ester, the concentration of the tert. butanolic tertiary sodium butoxide solution should be 0.1 N.

From among the various saturated acids of the above general Formula III which in accordance with the present invention can be converted into the corresponding unsaturated acids of Formula I, there may be mentioned, by way of example, the various bile acids such as cholic acid, cholanic acid, allocholanic acid, dehydrocholic acid, The invention is illustrated by the following examples to which it is not limited:

EXAMPLE 1

Preparation of starting materials of Formula III (a) Preparation of lithocholic acid.—50 g. of cholic acid was admixed with one litre of dry methanol containing 2.5% of hydrogen chloride in a 2-litre flask. The mixture was refluxed for two hours and thereafter concentrated to half its volume. The concentrate was transferred to a one-litre beaker and left to stand at room temperature overnight. A precipitate formed which consisted of 40 g. of colourless crystals melting at 154° C. The product was cholic acid methyl ester and the yield corresponded to 80% of the theory.

The procedure was repeated several times in order to obtain additional quantities of the ester.

106 g. of the above ester were converted into the corresponding 7,12-diketo-3-succinoxy compound by the method according to H. Heusser and H. Wuthier, H.C.A., 30, 2165 (1947). This diketo compound was admixed without isolation in a 3-litre flask with 500 cc. of an 85% aqueous hydrazine hydrate solution and 1000 cc. of ethylene glycol. The reaction mixture was refluxed for one hour at 100° C., then cooled; whereafter 200 g. of powdered potassium hydroxide was added through the condenser with simultaneous shaking of the flask. The potassium hydroxide was added over a period of half an hour at room temperature whereafter the condenser was removed and the mixture gradually heated to 200° C.

The reaction mixture was then refluxed for two to three hours and allowed to cool. To the cooled solution there was added 1.5 litres of hot water and the mixture was then transferred to a five-litre Erlenmeyer flask where it was admixed with additional 1.5 litres of hot water. To the hot solution hot concentrated hydrochloric acid was added while stirring until the solution turned acidic. The precipitated lithocholic acid was purified by dissolution in hot 1 N aqueous potassium hydroxide solution. Upon cooling of the solution the potassium salt of lithocholic acid precipitated in a gelatinous manner. The precipitate was separated by centrifugation and the salt redissolved in hot water. The solution was acidified by the addition of hydrochloric acid and the precipitated lithocholic acid filtered off and recrystallized from a methanol-water mixture. In this manner 90 g. of lithocholic acid melting at 184° C. was obtained.

(b) Preparation of lithocholic acid methyl ester.—The methyl ester of lithocholic acid was prepared by refluxing lithocholic acid for two hours in a 2.5% solution of hydrogen chloride in dry methanol. The solution was then concentrated to a small volume, extracted with benzene and the benzene extract washed first with water, then with an aqueous sodium bicarbonate solution and again with water. The washed extract was dried over sodium sulphate and thereafter concentrated to a volume of 100 cc. This concentrated solution was passed through an alumina column which was washed with benzene until the complete elution of the ester. The eluate was concentrated to a small volume and petroleum ether was added. The solution was heated and allowed to cool down to room temperature. There was obtained a crystalline precipitate melting at 90–92° C. After drying in vacuo at 80° C., the melting point of the crystalline lithocholic acid methyl ester was 125–126° C.

(c) Preparation of 3α - acetoxy-norcholanyl-diphenyl ethylene.—A solution of 0.2 mole of lithocholic acid methyl ester in 300 cc. of dry benzene was placed in a 3-litre flask and admixed with a solution of 3 moles of phenyl-magnesium bromide in dry ether. The reaction mixture was refluxed for three hours and thereafter concentrated in vacuo to a small volume. To the concentrated solution one litre of dry benzene was added and the resulting solution refluxed overnight. Thereafter the benzene solution was poured on ice and the mixture acidified with hydrochloric acid. The mixture was then extracted with benzene and the benzene extract washed with water and dried over sodium sulphate. Thereafter the benzene was evaporated in vacuo. The residue was (3α-hydroxy-cholanyl)-diphenyl carbinol.

The above carbinol was admixed with a mixture of 60 cc. acetic anhydride and 100 cc. of dry pyridine. The reaction was refluxed at 100° C. for 24 hours and thereafter the solvents removed by vacuum distillation. To the residue 200 cc. of glacial acetic acid was added and the reaction mixture again refluxed for 24 hours. After cooling pure 3α-acetoxy-norcholanyl-diphenyl ethylene was obtained, corresponding to the following formula

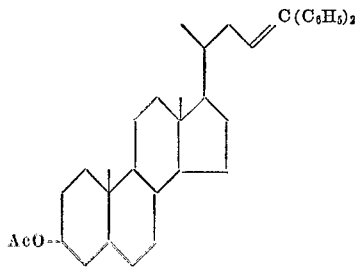

Analysis.—Calculated for $C_{38}H_{50}O_2$: C, 84.7%; H, 9.35%. Found: C, 84.7%; H, 9.39%.

U.V. spectrum: $\lambda_{max.}^{CHCl_3}$ 255–258 mµ (log ε=4.23)

$\alpha_D^{20} = +67°$ (1° in $CHCl_3$)

I.R. spectrum (KBr): 3077, 2963, 2899, 1733 (acetate CO), 1650, 1595, 1495 (double bonds) 1246 (acetate CO), 757–760, 696–700 (CH aromatic)cm.$^{-1}$.

(d) Preparation of 3α - hydroxy-norcholanyl-diphenyl ethylene.—The above acetyl derivative is refluxed for 12 hours in a 1 N solution of potassium hydroxide in ethanol. The solvent was then removed on a water bath, water was added, the solution acidified and extracted with chloroform. The chloroform extract was carefully washed with water and then dried over sodium sulphate. The chloroform was evaporated and the residue crystallized from ethanol. 3α-hydroxy-norcholanyl-dipenyl ethylene was obtained in the form of colourless crystals melting at 140–141° C.

Analysis.—Calculated for $C_{36}H_{48}O$: C, 87.0%; H, 9.74%. Found: C, 86.5%; H, 9.7%.

U.V. spectrum: $\lambda_{max.}^{CHCl_3}$ 255–258 mµ (log ε=4.23)

$\alpha_D^{17} = +52° \pm 2°$ (0.2% in $CHCl_3$)

I.R. spectrum (KBr): 3460, 3413(OH), 2950, 2878(CH), 1653, 1600, 1493 (double bonds), 1499, 1445, 1418, 1375, 757–760, 695 (phenyl).

(e) Preparation of 3α-acetoxy-norcholanic acid.—50 g. of 3α-acetoxy-norcholanyl-diphenyl-ethylene prepared in accordance with Example 1(c) above was suspended in 50 cc. of glacial acetic acid in a two-necked 250 cc. flask provided with a mechanical stirrer and a separation funnel. A suspension of 10 g. of chromium trioxide in glacial acetic acid was added dropwise at a temperature of 40–45° C. The rate of addition of chromium trioxide was determined by the rate of oxidation and from time to time the addition had to be interrupted. After 48 hours the resulting solution was poured into one litre of water and the mixture extracted with chloroform. The chloroform extract was washed with water and the wash water back extracted twice with chloroform. The chloroform extracts were combined, the solvent evaporated and the residue dissolved in 150 cc. of benzene. The benzene extract was extracted with several 20–30 cc. portions of a 1 N aqueous potassium hydroxide solution saturated with sodium chloride (in order to prevent emulsification). The potassium salt of 3α-acetoxy-norcholanic acid separated in the aqueous phase and formed a suspension therein. This suspension was back extracted with benzene. After the completion of the extraction and back extraction the alkaline aqueous suspension was acidified with hydrochloric acid and the aqueous acidic solution was then extracted with benzene. The benzene extract was carefully washed with water and dried over sodium sulphate. The benzene was evaporated and the dry residue acetylated by refluxing for 24 hours in a solution of 2% of acetic anhydride in glacial acetic acid. This acetylation was necessary since during the preceding alkaline extraction the 3α-acetoxy group was partially hydrolysed. After the termination of the refluxing the reaction mixture was concentrated to a 20 cc. volume and water was added dropwise until the appearance of a slight turbidity. The solution was then heated and allowed to cool whereupon colourless crystals precipitate which melt at 177–178° C. Yield 60–70%.

Analysis.—Calculated for $C_{25}H_{40}O_4$: C, 74.22%; H, 9.96%. Found: C, 72.89%; H, 10.68%.

$\alpha_D^{20} = +51°$ (1% in $CHCl_3$)

Instead of using chromium trioxide for the degradation of 3α-acetoxy-norcholanyl-diphenyl ethylene it is also possible to use sodium periodate in the presence of ruthenium oxide, or also ozone.

(f) Preparation of 3α-hydroxy-norcholanic acid (nor-lithocholic acid).—The above 3α-acetoxy acid was refluxed in 1 N alcoholic potassium hydroxide for 20 hours. The alcohol was then evaporated on a water bath and the same volume of water added. There precipitated the potassium salt of 3α-hydroxy-norcholanic acid. The salt was filtered, washed twice with 10 cc. portions of a 1 N aqueous potassium hydroxide solution and dissolved in hot water. The hot water solution was acidified with hydrochloric acid whereupon the 3α-hydroxy-norcholanic acid (norlithocholic acid) precipitated. The crude acid was washed with water and re-crystallized from methanol. There were obtained colourless crystals melting at 186° C.

*Analysis.*—Calculated for $C_{23}H_{38}O_3$: C, 76.55%; H, 10.71%. Found: C, 76.59%; H, 10.82%.

$\alpha_D^{20} = +32° \pm 3°$.

I.R. spectrum (KBr): 3390(OH), 2924, 1718(C), 1449, 1374, 1163, 1031 cm.$^{-1}$.

In the norlithocholic acid obtained in this manner, the 3-hydroxy group is in α-position. Since, however, for some purpose such as the production of 14-desoxy-digitoxigenin, the β-isomer is required, this isomer was prepared by conversion of 3α-hydroxy-norcholanic acid into 3-keto norcholanic acid, reduction of the 3-keto group back into the 3-hydroxy group which yielded mesomeric 3-hydroxy-norcholanic acid, and splitting of the mesomeric product into the 3α- and 3β-components. This was done as follows.

(g) *Preparation of 3-keto-norcholanic acid.*—1.6 g. of 3α-hydroxy-norcholanic acid were dissolved in 20 cc. of glacial acetic acid inside a 100 cc. Erlenmeyer flask. A solution of 1.2 g. of chromium trioxide in glacial acetic acid was added dropwise at room temperature at a rate corresponding to the rate of oxidation, i.e. chromium trioxide was only added after the chromium trioxide in the reaction mixture was fully converted into tervalent chromium oxide (green colour). The oxidation was completed after the reaction mixture had turned brownish. Any excess of chromium trioxide was reduced by the addition of methanol. Thereafter, the liquid phase was evaporated in vacuo, the residue extracted with ether, the extract washed with water and the ether evaporated. The residue consisted of crude 3-keto-norcholanic acid. It was crystallized from an acetone-water mixture and precipitated in the form of colourless crystals melting at 180 to 181° C. Yield 1.5 g.

*Analysis.*—Calculated for $C_{23}H_{36}O_3$: C, 76.41%; H, 10.3%. Found: C, 76.8%; H, 10.16%.

The chromium trioxide oxidation can also be effected in pyridine as solvent instead of glacial acetic acid.

(h) *Preparation of mesomeric 3-hydroxy-norcholanic acid.*—Reduction of the 3-keto compounds was effected catalytically under pressure in a Parr apparatus. To a solution of 1.5 g. of 3-keto-norcholanic acid in 30 cc. of acetic acid there was added 0.5 cc. of conentrated hydrochloric acid and 400 mg. of platinum dioxide. After shaking for 15 minutes in a hydrogen atmosphere under pressure of 50 p.s.i. the walls of the reaction vessel were rinsed with a small amount of acetic acid, the reaction mixture was diluted with water and the catalyst filtered off.

(i) *Splitting of epimeric 3-hydroxy-norcholanic acid into the 3α-hydroxy and 3β-hydroxy epimers.*—1 g. of the epimeric mixture obtained in accordance with the preceding example was admixed with 3 g. of digitonin in 700 cc. of ethanol (95%). The digitonide of the β-epimer precipitated immediately. The precipitate was filtered off, washed with ethyl alcohol and dried. The dry digitonide was dissolved in a small amount of pyridine and the solution left to stand for three hours at room temperature. In this manner the digitonide was decomposed into its components. 3β-hydroxy-norcholanic acid was isolated by extraction of the reaction mixture with ether. The insoluble material was filtered off and the ether solution washed with 1 N aqueous sulphuric acid for the removal of pyridine. The ether was then removed by distillation and the residue crystallized from an ethanol-water mixture. 3β-hydroxy-norcholanic acid was obtained in the form of colourless crystals melting at 186–187° C. Upon admixture of the product with the α-epimer, the melting point was depressed by 25° C. Yield 40–50%.

*Analysis.*—Calculated for $C_{23}H_{38}O_3$: C, 76.55%; H, 10.71%. Found: C, 76.22%; H, 10.44%.

Instead of decomposing the β-hydroxy-norcholanic acid digitonide with pyridin it is also possible to effect the decomposition with methanol. The products obtained in both ways were identical.

(j) *Preparation of 3β-acetoxy-norcholanic acid.*—A solution of 800 mg. 3β-hydroxy-norcholanic acid in 15 cc. of glacial acetic acid containing 2% by weight of acetic anhydride were refluxed in a 50 cc. flask for 24 hours. Thereafter water was added in small portions while continuing the heating, until the appearance of a slight turbidity. The solution was then allowed to cool and the 3β-acetoxy-norcholanic acid precipitated in the form of colourless crystals melting at 198° C.

*Analysis.*—Calculated for $C_{25}H_{40}O_4$: C, 74.22%; H, 9.96%. Found: C, 74.02%; H, 9.79%.

I.R. spectrum (KBr): 2950, 1739(COAc), 1718(CO), 1460–1420, 1389, 1266–1244(CO), 1163, 1031 cm$^{-1}$.

(k) *Preparation of 3α-hydroxy-norcholanic acid methyl ester.*—3α-hydroxy-norcholanic acid was esterified in the conventional manner by dissolving the acid in methanol containing 2.5% of hydrogen chloride and refluxing the mixture for 2 hours. Thereafter the solvent was evaporated, the residue dissolved in chloroform, the chloroform solution washed first with water, then with an aqueous sodium bicarbonate solution and again with water. After drying the solution over sodium sulphate, the solvent was removed and the desired ester obtained as residue.

(l) *Preparation of 3α-acetoxy-norcholanic acid methyl ester.*—200 mg. of the ester obtained in the preceding example was refluxed in a 50 cc. flask with 10 cc. of acetic anhydride for 2 hours. Thereafter the solvent was removed in vacuo, the residue dissolved in benzene, the solution washed first with water, then with an aqueous sodium bicarbonate solution and again with water. After drying over sodium sulphate, the solvent was removed by distillation and the residue crystallized from 95% ethanol. 3α-acetoxy-norcholanic acid methyl ester was obtained in the form of colourless crystals melting at 162–163° C.

*Analysis.*—Calculated for $C_{26}H_{42}O_4$: C, 74.60%; H, 10.10%. Found: C, 75.38%; H, 10.14%.

(m) *Preparation of 3β-acetoxy-norcholanic acid methyl ester.*—This ester was prepared in complete analogy to the α-epimer described in the preceding example. M.P. 149° C.

*Analysis.*—Calculated for $C_{26}H_{42}O_4$: C, 74.60%; H, 10.10%. Found: C, 74.8%; H, 10.22%.

The 3-hydroxy-norcholanic acid and its functional derivatives obtained in accordance with this example were used for the preparation of the corresponding 22-bromo compounds as will be described in the following Example 2.

3β-hydroxy-norcholanic acid may also be prepared from the 3α-epimer by an alternative procedure outlined in the following Examples (n) and (o).

(n) *Preparation of 3β-acetoxy-norcholanic acid methyl ester.*—1 g. of methyl 3α-hydroxy-norcholanic acid methyl ester was dissolved in 5 cc. dry pyridine and to it was added with shaking a solution of 750 mg. p-toluenesulfonyl chloride in 5 cc. of dry pyridine, at 0° C. It was allowed to stand at 10–20° C. for 48 hours and then poured onto a mixture of ice and dilute hydrochloric acid.

The precipitate was collected, dissolved in chloroform, washed first with dilute hydrochloric acid and then with aqueous potassium carbonate and water. After drying the solvent was removed and the colourless solid of methyl 3α-tosyl-norcholanic (1.4 g.) thus obtained was used further without purification. It was dissolved in 30 cc. of glacial acetic acid, and 1.5 g. of anhydrous lithium acetate was added. The mixture was refluxed for 18 hours and then solvent was removed by distillation in vacuo. The residue was taken up with chloroform, washed with water, dried, and the solvent removed. The residue gave upon recrystallization from ethanol 1.0 g. of colourless crystals of methyl 3β-acetoxy-norcholanate, M.P. 149° C. Overall yield: 90%. It was identical with a specimen obtained in a manner described in Example 1(1), as to M.P. mixed M.P. and infrared spectrum.

(o) Preparation of 3β-hydroxy-norcholanic acid.— The alkaline hydrolysis of methyl 3β-acetoxy-norcholanate was effected by dissolving 1 g. of the ester in a mixture of 25 cc. ethanol and 25 cc. 2 N potassium hydroxide solution and refluxing for 18 hours. Ethanol was then removed by evaporation and 10 cc. of concentrated hydrochloric acid was added. The precipitate of 3β-hydroxy-norcholanic acid was collected and recrystallized from ethanol water, providing 0.8 g. of colourless crystals melting at 186–187° C.

EXAMPLE 2

Preparation of bromo compounds of Formula II (a) Preparation of 3α-acetoxy-22-bromo-norcholanic acid methyl ester.—3 g. of 3α-acetoxy-norcholanic acid methyl ester was placed in a flask provided with a dropping funnel, a reflux condenser sealed with a calcium chloride tube and a duct linking the lower part of the reflux condenser with the upper part of the dropping funnel. 4 cc. of thionyl chloride was added through the dropping funnel and the mixture heated for one hour to 40–60° C. Thereafter the temperature was raised to 70° C. and a solution of 0.44 cc. of bromine in 2 cc. of thionyl chloride (about 10% excess of bromine) added dropwise through the dropping funnel. The rate of addition of the bromine was equal to the rate of bromine consumption in the course of the reaction. After 24 hours the flask was cooled with ice water, 20 cc. of dry methanol added through the dropping funnel and the mixture left to stand overnight. Thereafter the solvents were removed in vacuo and 25 cc. of ether added. There resulted a turbid solution from which after some time almost colourless crystals precipitated. The precipitate was purified by chromatography on an alumina with benzene as solvent. 3α-acetoxy-22-bromo-norcholanic acid methyl ester was obtained in the form of colourless crystals melting at 220° C.

*Analysis.*—Calculated for $C_{26}H_{41}O_4Br$: C, 62.77%; H, 8.30%. Found: C, 62.32%, H, 8.84%.

The yield was not quite constant and varied between the experiments. Yields as high as 50% were obtained.

(b) Preparation of 3β-acetoxy-22-bromo-norcholanic acid methyl ester.—The compound was prepared from 3β-acetoxy-norcholanic acid methyl ester in analogy to the α-epimer described in the preceding example.

Refluxing of either of the two epimers for 24 hours in a 1 N potassium hydroxide solution in 1./l. alcohol-water mixture resulted in hydrolysis into 3α(β)-22-dihydroxy-norcholanic acid.

(c) Preparation of 3α-acetoxy-22-bromo-norcholanic acid.—3.4 g. of 3α-acetoxy-norcholanic acid were placed in a similar device as used in the preceding Example 2(a). 4 cc. of thionyl chloride was added through the dropping funnel and the mixture heated for one hour to 40–60° C. Thereafter a solution of 0.5 cc. of bromine and 0.75 cc. of pyridine in 3 cc. of thionyl chloride was added dropwise through the dropping funnel. The rate of bromine addition was in line with the rate of bromine consumption. After five hours of heating at 40–60° C. the reaction was completed and the solvents evaporated in vacuo. The residue was dried in vacuo at 50° C., cooled and admixed with 10 cc. of cold acetone. The mixture was stirred with a glass rod and crystals precipitated. The precipitate was filtered off and washed several times with 3 cc. portions of cold acetone. The crystals were then immediately dried in vacuo at 100° C. In this manner 2 g. of 3α-acetoxy-22-bromo-norcholanic acid chloride was obtained in a yield of 50%. M.P. 198–200° C.

To the cold filtrate there was added at once 100 cc. of water and the mixture extracted with chloroform. The chloroform extract was carefully washed with water and then concentrated to a volume of 10 cc. 100 cc. of carbon tetrachloride was added and the solution passed through a column of 30 g. silica gel (diameter 2 cm. length 30 cm.). The column was first eluted with carbon tetrachloride until this solvent did not elute any further substance. The column was then eluted with a mixture of 100 parts of carbon tetrachloride and 30 to 100 parts of chloroform. There was obtained 3α-acetoxy-22-bromo-norcholanic acid in the form of crystals melting between 210 and 230° C. Yield 1.2 g.

The acid chloride obtained as described above was hydrolyzed with an acetone-water mixture which yielded 3α-acetoxy-22-bromo-norcholanic acid. This product was identical with the one obtained from the mother liquor of the acid chloride.

The unsharp melting point of the 22-bromo acid is to be explained by the fact that the product is a mixture of two epimers in which the 22-bromo atom is of different configuration. By repeated chromatographic separation on silica gel and elution with chloroform-carbon tetrachloride, the acids could be separated into the three following fractions:

Fraction 1.—Elution with a mixture of 100 parts carbontetrachloride and 30 parts of chloroform which yielded about one-third of the starting material; M.P. 200–215° C.

Fraction 2.—Elution with a mixture of 100 parts carbon tetrachloride and 60 parts of chloroform yielding another third of the product; M.P. 216—220° C.

Fraction 3.—Elution with pure chloroform yielding another third of the product; M.P. unsharp between 200–220° C.

(d) Preparation of 3α-acetoxy-23-bromo-cholanic acid.—A solution of 10 g. of 3α-hydroxy-cholanic acid in 100 cc. of glacial acetic acid containing 2% by weight of acetic anhydride was refluxed for 48 hours. After cooling, the 3α-acetoxy-cholanic acid precipitated in the form of colourless crystals melting at 170–171° C.

3 g. of the above acetyl compound were introduced into the same device as used in Example 2(a). 4 cc. of thionyl chloride were added through the dropping funnel and the mixture heated for one hour at 40–60° C. The temperature was then raised to 70° C. and a solution of 0.44 cc. of bromine (10% excess) in 0.66 cc. of pyridine in 4 cc. of thionyl chloride was added. The rate of addition corresponded to the rate of bromine consumption by the reaction. After heating for five hours at 70° C. the solvents were evaporated in vacuo. The residue was cooled with ice water and 20 cc. of cold water was added. The resulting solution was extracted with chloroform and the chloroform extract washed with water. The extract was dried over sodium sulphate and the chloroform removed by distillation.

The product was purified by chromatography on silica gel, using for the elution various mixtures of chloroform and carbon tetrachloride. The product was crystallized from acetone-petroleum ether, giving 2.5 g. (71%) of colourless crystals melting at 213–215° C.

Similar results were obtained when using for the bromination pyridinium hydrobromide perbromide instead of pyridine and bromine. The procedure was as follows:

5 g. of 3α-acetoxy-cholanic acid was admixed with 4 g. of pyridinium-bromide perbromide (M.P. 132–134° C.) and to it was added with shaking 10 cc. of thionyl chloride. The mixture was heated at 60–65° C. for 8 hours and then the excess thionyl chloride was removed by distillation at reduced pressure. The residue was treated with water and then extracted with chloroform, the extract washed with water and aqueous sodium bisulphite solution and dried over sodium sulphate. After concentraction of the chloroform solution to a volume of 10 cc., 300 cc.

of carbon tetrachloride was added and the solution then chromatographed over silica gel, yielding 5.41 g. (90–91% yield) of 3α-acetoxy-23-bromo-cholanic acid. Recrystallization from acetone-petroleum ether yielded colourless crystals, M.P. 213–215° C.

*Analysis.*—Calculated for $C_{26}H_{41}BrO_4$: Br, 16.10%. Found: Br, 16.26%.

I.R. spectrum (KBr): 2941, 1739, 1460, 1389, 1266–1250, 1176, 1053 and 990 cm.$^{-1}$.

The preparation of the 3β-epimer of any of the compounds described in Example 2(c) to 2(d) is effected in a completely analogous manner.

EXAMPLE 3

Conversion of compounds of Formula II into the the corresponding hydroxy acids (a) Preparation of 3α,22-dihydroxy-norcholanic acid.— A mixture of 1 g. of 3α-acetoxy-22-bromo-norcholanic acid and 20 cc. of 1 N aqueous ethanolic (50% v./v.) potassium hydroxide was refluxed for 24 hours. After removal of the solvent the residue was acidified with hydrochloric acid, and the precipitate collected and recrystallized from chloroform. M.P. 260° C. Yield quantitative.

*Analysis.*—Calculated for $C_{23}H_{38}O_4 \cdot \frac{1}{2}H_2O$: C, 71.29%; H, 10.14%. Found: C, 71.6%; H, 10.30%.

I.R. spectrum (KBr): 3448–3333, 2941, 2874, 1724, 1453, 1381, 1285 cm.$^{-1}$.

(b) 3β-22-dihydroxy-norcholanic acid.—The compound was prepared in a completely analogous manner from 3β-acetoxy-22-bromo-norcholanic acid, in the same yield. M.P. 260–262° C.

*Analysis.*—Found: C, 71.2%; H, 10.10%.

The I.R. spectrum was identical with that of the 3α-epimer.

(c) 3α,23-dihydroxy-cholanic acid.—The compound was obtained in 93% yield following the procedure described above, starting with 3α-acetoxy-23-bromo-cholanic acid. Recrystallization from chloroform yielded crystals melting at 230–231° C.

*Analysis.*—Calculated for $C_{24}H_{40}O_4$: C, 73.43%; H, 10.27%. Found: C, 73.02%; H, 10.27%.

I.R. spectrum (KBr): 3448–3333, 2941–2857, 1724, 1460, 1389, 1286 cm.$^{-1}$.

EXAMPLE 4

Preparation of compounds of Formula I (a) Preparation of 3α - hydroxy - $\Delta^{20,22}$-norcholenic acid.—800 mg. of 3α-acetoxy-22-bromo-norcholanic acid was admixed with 2 cc. of thionyl chloride and heated for one hour at 40–60° C. with the exclusion of humidity. The reaction mixture was then cooled with ice water and dry methanol added in small portions of 20 cc. each. The reaction mixture was refluxed for half an hour and then left to stand at room temperature for four hours. The mixture was then extracted with benzene, the extract washed first with water, then with a 1 N aqueous sodium hydroxide solution and then again with water. The washed extract was dried over sodium sulphate and thereafter the solvent was evaporated. In this manner 3α-acetoxy-22-bromo-norcholanic acid methyl ester was obtained.

780 mg. of the above ester was dissolved in 40 cc. of tertiary butanol. The solution was admixed with 10 cc. of an 0.5 N solution of sodium tert. butoxide in tert. butanol and 800 mg. of sodium iodide. The reaction mixture was refluxed for about 3 days and thereafter concentrated to a small volume on a water bath. The concentrated solution was diluted with water, acidified with dilute hydrochloric acid and extracted with chloroform. The chloroform extract was reduced to a small volume and diluted with ten times its volume of carbon tetrachloride. The resulting dilute solution was fed into a silica gel column (60 cm. long and 2 cm. diameter) containing 30 g. of silica gel and the product eluted with a 1:1 chloroform/carbon tetrachloride mixture. In this manner 480 mg. (70% yield) of 3α-hydroxy-$\Delta^{20,22}$-norcholenic acid was obtained. M.P. 210–211° C.

*Analysis.*—Calculated for $C_{23}H_{36}O_3$: C, 76.6%; H, 10.1%. Found: C, 76.3%; H, 10.0%.

(b) Preparation of 3β - hydroxy - $\Delta^{20,22}$-norcholenic acid.—The compound was prepared by dehydrobromination of 3β - acetoxy - 22-bromo-norcholanic acid methyl ester by means of sodium tert. butoxide in tert. butanol in a manner described in Example 3(a). 90% yield. Melting point and I.R. spectrum are the same as of the 3α-epimer.

(c) Preparation of the butenolide of 3α-acetoxyperhydro cyclopentano phenantrene.—To show the production of cardioactive compounds from the intermediates of the present invention, the 3α-hydroxy-$\Delta^{20,22}$-norcholenic acid may be reacted as follows in accordance with the procedure of copending application Ser. No. 385,781 to form the butenolide of 3α-acetoxyperhydro cyclopentano phenantrene.

370 mg. of 3α-hydroxy-$\Delta^{20,22}$-norcholenic acid were dissolved in 15 cc. of acetic acid, the solution was placed in a 50 cc. flask and 370 mg. of selenium dioxide were added. The reaction mixture was refluxed for two hours. Already in the first minutes there formed a black precipitate of selenium which increased in the course of the reaction. After the refluxing was completed, the mixture was filtered into a separating funnel and extracted with 100 cc. of benzene. The benzene extract was washed first with water and then with a 5% aqueous potassium carbonate solution for the complete removal of acidic substances. All the aqueous washings were combined and re-extracted in a second separating funnel with 50 cc. of benzene. The combined benzene solutions were dried over sodium sulphate and thereafter the benzene was evaporated to dryness. After 80% of the starting material was lactonized. The remaining 20% were acidic substances which passed over into the alkaline aqueous phase. The product contained a 3α-acetoxy group owing to acetylation in the course of the reaction, and had a yellow-brownish coloration. The crude substance could not be purified even upon repeated chromatography on silica gel. The U.V. absorption spectrum in alcoholic solution showed an absorption band at 217–218 mµ which is characteristic for butenolides. Against this, the absorption band at 224–226 mµ, which is characteristic for the unsaturated acid serving as starting material, was completely absent both in the lactone and in the acidic substances that went over into the alkaline aqueous phase.

It will be obvious to those skilled in the art that various changes may be made without departing from the scope of the invention and the invention is not to be considered limited to what is described in the specification.

What is claimed is:

1. A process for preparing a compound of the formula

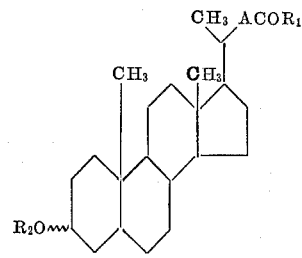

wherein A is a member of the group consisting of =CH—, —CH=CH— and —B—CH=CH— where B is an alkylene radical, $R_1$ is a member of the group consisting of —OH, halogen and esterifying alcohol radicals and $R_2$ is a member of the group consisting of —H, lower alkyl and lower acyl radicals, which process comprises reacting a compound of the formula

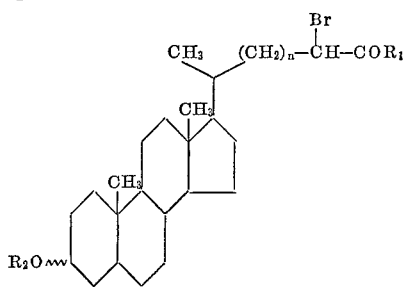

wherein $n$ is an integer from 0 and up, with an alkali metal lower alkoxide in a lower alkanol.

2. The process according to claim 1, wherein said alkoxide is an alkali metal tert. butoxide and said alkanol is tert. butanol.

3. The process according to claim 1, wherein the reaction is carried out in the presence of an alkali metal iodide.

4. The process according to claim 1, serving for the production of a free acid as final product comprising the additional step of converting said free acid into the corresponding lower-alkyl ester.

5. The process according to claim 1, serving for the preparation of an ester as final product comprising the additional step of hydrolyzing said ester into the corresponding free acid.

6. The process according to to claim 1, serving for the preparation of a compound that bears a free 3-hydroxy group, comprising the additional step of hydrolysis of a 3-acyloxy group.

7. A process for preparing a compound of the formula

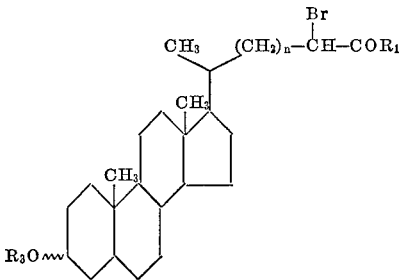

wherein $n$ is an integer from 0 and up, $R_1$ is a member of the group consisting of —OH, halogen and esterifying alcohol radicals and $R_3$ is a member of the group consisting of —H, lower alkyl and lower acyl radicals, which process comprises reacting a compound of the formula

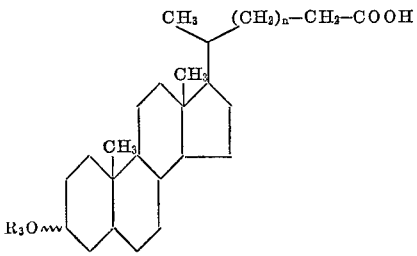

with bromine in thionyl chloride.

8. The process according to claim 7, wherein there is used as catalyst a member of the group consisting of pyridine, pyridine hydrobromide and hydrogen halide.

9. The process that comprises reacting a compound of the second formula given in claim 1 with pyridinium hydrobromide perbromide in thionyl chloride.

10. The process of preparing a compound selected from the group consisting of 3-acyloxy and 3-alkoxy cholenic acid derivatives which comprises reacting a member of the consisting of 3-acyloxy and 3-alkoxy derivatives of norcholanic acid with bromine in thionyl chloride in the presence, as catalyst, of a member of the group consisting of pyridine and pyridine hydrobromide, and reacting the resulting 22-bromo compound with sodium tert. butoxide in tert. butanol in the presence of sodium iodide.

11. The process according to claim 10, comprising the additional step of converting any 22-bromo acid into the corresponding lower-alkyl ester.

12. The process according to claim 11, comprising the additional step of hydrolysis of the $\Delta^{20,22}$-unsaturated ester obtained as final product.

13. The process according to claim 10, wherein the final product comprises a 3-acyloxy group, comprising the additional step of hydrolysis into the corresponding 3-hydroxy compound.

14. The process of preparing a compound selected from the group consisting of 3-acyloxy cholenic acid derivatives which comprises reacting a compound of the group consisting of 3-acyloxy and 3-alkoxy derivatives of cholenic acid with bromide in thionyl chloride, in the presence, as catalyst, of a member of the group of pyridine and pyridine hydrobromide, and reacting the resulting 22-bromo compound with lithium tert. butoxide in tert. butanol in the presence of sodium iodide.

15. The process according to claim 14, comprising the additional step of converting any 22-bromo acid into the corresponding lower alkyl ester.

16. The process according to claim 15, comprising the additional step of hydrolysis of the $\Delta^{22,23}$-unsaturated ester obtained as final product.

17. The process according to claim 15, wherein the final product comprises a 3-acyloxy group, comprising the additional step of hydrolysis into the corrsponding 3-hydroxy compound.

18. The process of preparing 3β-hydroxy-norcholenic acid, which comprises reacting an ester of 3α-hydroxy-norcholanic acid with p-toluene-sulfonyl chloride in pyridine, reacting the resulting 3α-tosyl compound with lithium acetate in anhydrous glacial acetic acid, and recovering the resultant 3β-acetoxy-norcholanic acid.

19. The process according to claim 18, comprising the additional step of converting the resulting 3β-acetoxy-norcholanic acid ester into the free acid.

20. 3,22-dihydroxy-norcholanic acid.

21. 3,23-dihydroxy-cholanic acid.

References Cited

UNITED STATES PATENTS

| 3,342,811 | 9/1967 | Sarel et al. | 260—239.5 |
| 3,342,813 | 9/1967 | Sarel et al. | 260—239.57 |
| 2,362,439 | 11/1944 | Ruzicka | 260—239.5 |

FOREIGN PATENTS

| 544,051 | 3/1942 | Great Britain. |

ELBERT L. ROBERTS, Primary Examiner

U.S. Cl. X.R.

260—239.57

UNITED STATES PATENT OFFICE
CERTIFICATE OF CORRECTION

Patent No. 3,463,795                        August 26, 1969

Shalom Sarel et al.

It is certified that error appears in the above identified patent and that said Letters Patent are hereby corrected as shown below:

Column 6, line 17, the formulas should appear as shown below

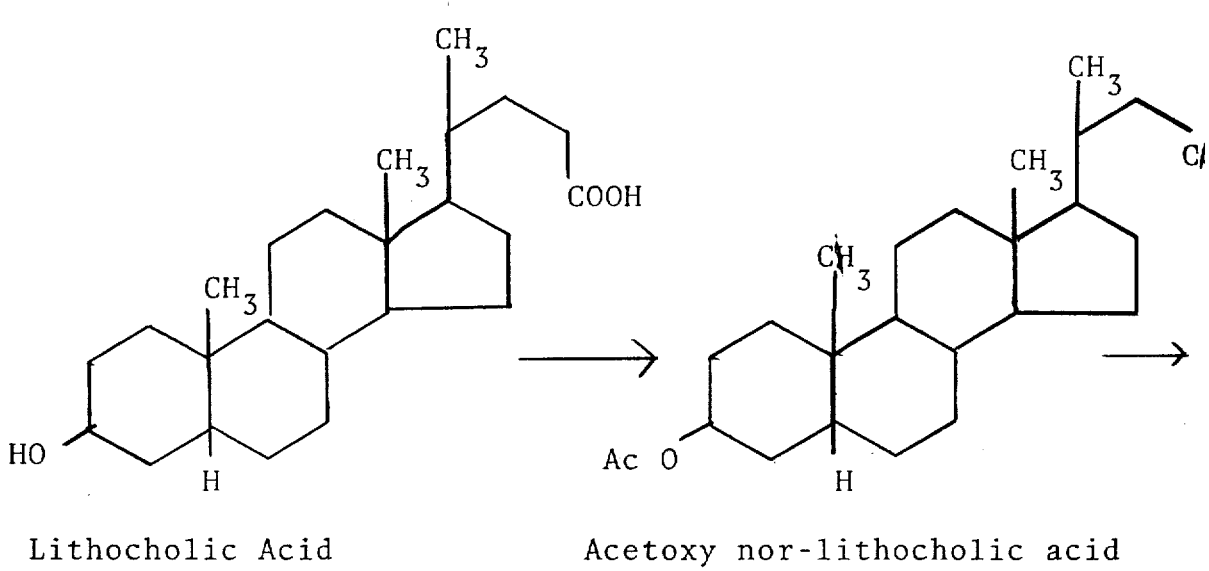

Lithocholic Acid                Acetoxy nor-lithocholic acid

Column 16, line 6, after "the" insert -- group --; line 42, "hydroxy-norcholenic" should read -- acetoxy-norcholanic --.

Signed and sealed this 26th day of May 1970.

(SEAL)
Attest:

EDWARD M. FLETCHER, JR.           WILLIAM E. SHCUYLER, JR.
Attesting Officer                    Commissioner of Patents